United States Patent
Lee et al.

(10) Patent No.: US 6,215,542 B1
(45) Date of Patent: Apr. 10, 2001

(54) LIQUID CRYSTAL DISPLAY WITH IMPROVED VIEWING ANGLE AND TRANSMITTANCE

(75) Inventors: Seung Hee Lee; Bong Gyu Rho; Han Jun Park, all of Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/104,757

(22) Filed: Jun. 25, 1998

(30) Foreign Application Priority Data

Jun. 27, 1997 (KR) .................................................. 97-28456

(51) Int. Cl.$^7$ .................................................. G02F 13/43
(52) U.S. Cl. ............................................. 349/143; 349/146
(58) Field of Search ................................. 349/143, 145, 349/146, 38, 96, 117, 139, 178

(56) References Cited

U.S. PATENT DOCUMENTS

| | | | |
|---|---|---|---|
| 4,490,015 | * 12/1984 | Kawarada et al. | 349/165 |
| 5,136,407 | * 8/1992 | Clerc | 349/143 |
| 5,182,664 | * 1/1993 | Clerc et al. | 349/130 |
| 5,229,873 | * 7/1993 | Hirose et al. | 349/143 |
| 5,309,264 | * 5/1994 | Lien et al. | 349/143 |
| 5,339,181 | * 8/1994 | Kim et al. | 349/110 |
| 5,589,965 | 12/1996 | Bahadur et al. | 349/117 |
| 5,615,028 | * 3/1997 | Ishiguro et al. | 349/42 |

FOREIGN PATENT DOCUMENTS 728063    1/1995  (JP) .

* cited by examiner

*Primary Examiner*—James A. Dudek
*Assistant Examiner*—Toan Ton
(74) *Attorney, Agent, or Firm*—Selitto & Associates, P.C.

(57) ABSTRACT

In a liquid crystal display having a pixel electrode and a counter electrode respectively formed on a lower substrate and a upper substrate, the electric field in ellipse form, is symmetrical between the pixel electrode and the counter electrode by forming an opening part in the pixel electrode or the counter electrode. Accordingly, the viewing angle feature, when voltage is applied to the liquid crystal display is enhanced.

12 Claims, 6 Drawing Sheets

LIQUID CRYSTAL DISPLAY WITH IMPROVED VIEWING ANGLE AND TRANSMITTANCE

BACKGROUND OF THE INVENTION

1. Field of the Invention

The present invention is related to a liquid crystal display (LCD), and more particularly to a LCD having an improved viewing angle and transmittance.

2. Related Art

A liquid crystal display(LCD) has an optical aniostropy owing to a structure thereof. The optical anisotropy(or refraction index anisotropy) means that a refraction index at a major axis of a liquid crystal molecule is different from that at a minor axis of the liquid crystal molecule. Because of the optical aniostropy, a polarization of the light passing through the liquid crystal molecule and oscillating direction of the polarized light are varied. The refraction index is represented as a difference between a refraction index in a direction parallel to the major axis of the liquid crystal molecule(ordinary refraction index) and a refraction index in another direction perpendicular to the major axis thereof (extraordinary refraction index), which is called as a birefringence. On the other hand, in applying a voltage to the liquid crystal cell, the liquid crystal molecules are rearranged owing to a dielectric anisotropy of the liquid crystal and light passes through the rearranged liquid crystal molecules.

Figure 1A:
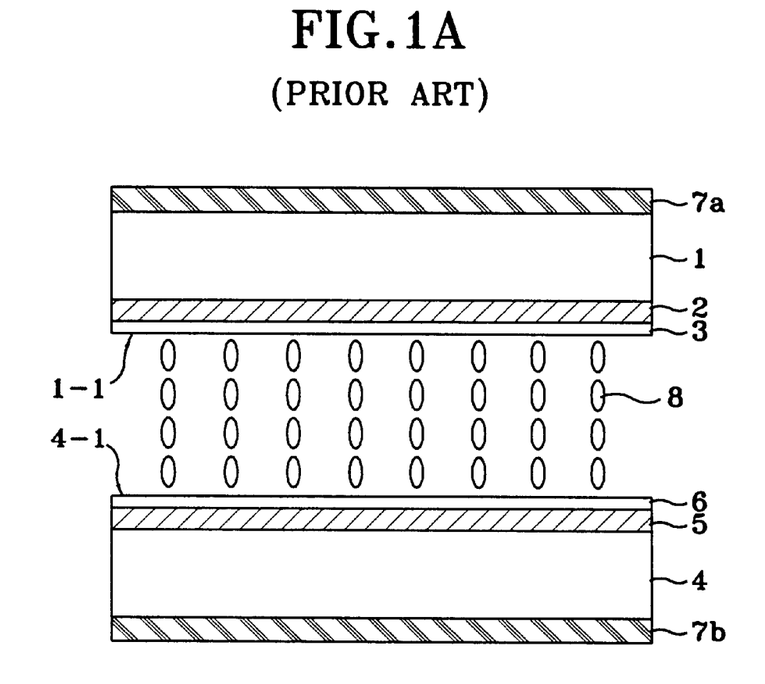
FIGS. 1A tand 1B are cross-sectional views of the ECB mode LCD.
Figure 1B:
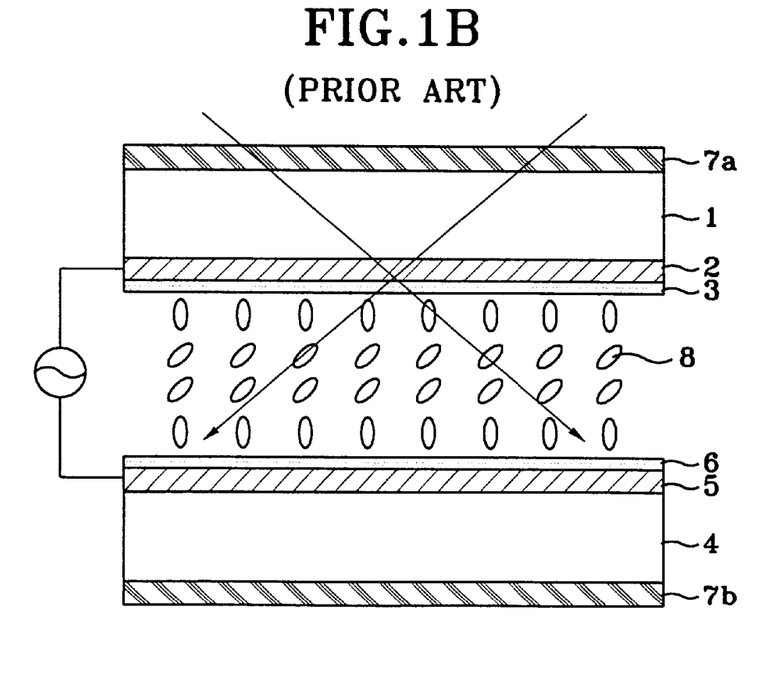

FIGS. 1A and 1B show an electrically controlled birefringence(ECB) mode liquid crystal display(LCD) using the birefringence of the liquid crystal molecule, wherein the LCD in FIG. 1A is under no voltage applied thereto and the LCD in FIG. 1B is subjected to the applied voltage.

The liquid crystal molecules 8 are formed between a upper substrate 1 and a lower substrate 4. On an opposite surface of the upper substrate 1 and an opposite surface of the lower substrate 1, are respectively formed a counter electrode 2 and a pixel electrode 5 on which vertical alignment layers 3 and 6 are disposed. On a non-opposite surface of the upper substrate 1 and a non-opposite surface of the lower substrate 4, are disposed the respective polarization layers 7a and 7b. The vertical alignment layers 3 and 6 are rubbed so as to have a pretilt angle of about 85 to 89 degrees.

In no applied voltage, as shown in FIG. 1A, all the liquid crystal molecules of the ECB mode LCD are vertically arranged to the upper substrate and the lower substrate. In applying voltage to the LCD, as shown in FIG. 1B, the liquid crystal molecules which are directly contacted with the vertical alignment layers of the upper substrate and the lower substrate maintain their original state and the liquid crystal molecules between the most outer liquid crystal molecules are slantly arranged in a given direction.

The ECB mode LCD has a merit of high contrast ratio. However, since when applying voltage, the liquid crystal molecules in the middle part of the liquid crystal layer are oriented in one direction, a phase retardation is different according to the viewing angle. Accordingly, the transmittance is varied responsive to the viewing angle and thus the viewing angle becomes narrow. On the other hand, when no voltage is applied to the LCD, a complete dark state can be realized at a just front of the liquid crystal cell. However, at a side of the liquid crystal cell there is the phase retardation with respect to the front, so a leakage current of the LCD is generated.

SUMMARY OF THE INVENTION

Accordingly, an aim of a present invention is to improve a viewing angle when voltage is applied to a liquid crystal display(LCD) while preventing a leakage current of the LCD in no applied voltage.

In order to accomplish an aim of the present invention, a liquid crystal display(LCD) comprises a first substrate, a first electrode formed on the first substrate and being a plate shape, a second substrate opposite the first substrate, and a second electrode formed on the second substrate and being a plate shape provided with a given opening part. Here, one of the first electrode and the second electrode is a counter electrode and the other is a pixel electrode. The opening part shape is rectangular. The second electrode has at least one opening part therein. In case where the opening part is two or more, a width of the opening part is less than a distance between the opening part and the adjacent opening part. The width of the opening part is preferably 3 to 5 μm. The liquid crystal used in the LCD has a type of negative dielectric anisotropy.

In another case, the second electrode includes a rectangular frame, a first part vertically and inwardly protruded from one side of the rectangular frame and a second part inwardly protruded from an end of the first part in a circle shape. The opening part is defined by the rectangular frame, the first part and the second part. A width of the rectangular frame, a width of the first part, a radius of the second part are larger than a width of the opening part.

So as to prevent a light leakage current of the LCD, the LCD further comprises a first polarization layer formed on the non-opposite surface of the first substrate, a second polarization layer formed on the non-opposite surface of the second substrate and a optical phase retardation compensation film formed at least between the first substrate and the first polarization layer and between the second substrate and the second polarization layer. Further, the LCD comprises a storage electrode, over the second substrate, overlapping the second electrode at a selected portion, the border of the pixel electrode.

The electric field generated between the pixel electrode and the counter electrode is an ellipse shape and symmetrically formed centering around a center of the opening part between the pixel electrode and the counter electrode. Therefore, the viewing angle of the LCD is increased when voltage is applied to the LCD. The light leakage under no applied voltage, is prevented by compensating the phase retardation using the optical phase retardation compensation film.

BRIEF DESCRIPTION OF THE ATTACHED DRAWINGS

FIGS. 2A and 2B illustrate a first embodiment according to the present invention, wherein

FIGS. 4A and 4B illustrate a second embodiment according to the present invention, wherein

FIGS. 5A and 5B illustrate a third embodiment according to the present invention, wherein

FIGS. 6A and 6B illustrate a fourth embodiment according to the present invention, wherein

DESCRIPTION OF THE PRESENT INVENTION

A counter electrode or pixel electrode has an opening part, so when voltage is applied to a liquid crystal display(LCD) a fringe field is produced between the pixel electrode and the counter electrode. Accordingly, a viewing angle of the LCD is improved. Also, an optical phase retardation compensation film is provided to the LCD so as to form complete dark state at front and side of the LCD when no voltage is applied.

First Embodiment

Figure 2A:
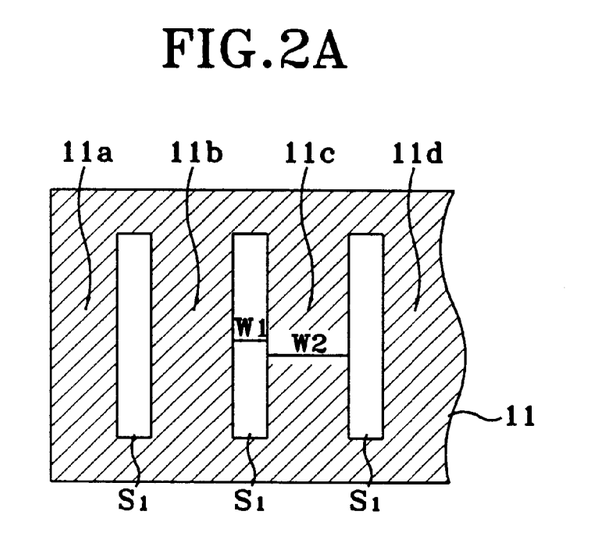
FIG. 2A shows a counter electrode and FIG. 2B shows a sectional view along the LCD including the counter electrode in FIG. 2A.
Figure 2B:
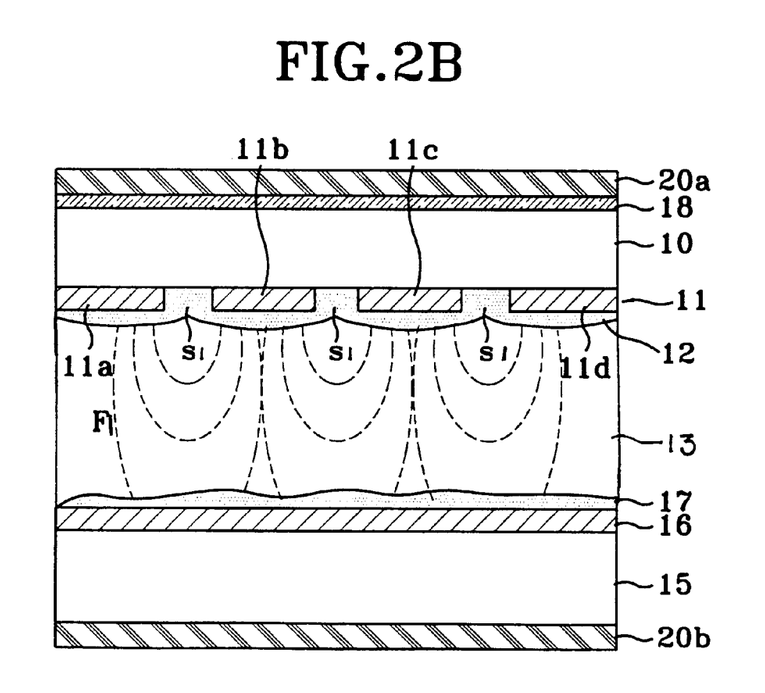

FIG. 2B is a cross sectional view of the LCD according to the first embodiment of the present invention. The LCD comprises a upper substrate 10, a lower substrate 15, a counter electrode 11 and a pixel electrode 16 respectively formed on an opposite surface of the upper substrate 10 and the lower substrate 15, vertical alignment layers 12 and 17 formed on the pixel electrode 16 and the counter electrode 11, polarization layers 20a and 20b formed on a non-opposite surface of the upper substrate 10 and a non-opposing surface of the lower substrate 15 and an optical phase retardation compensation film 18 formed between the upper substrate 10 and the polarization layer 20a. The pixel electrode 16 is made of transparent material. The counter electrode 11, as shown in FIG. 2A, has at least one opening part S1 and is made of transparent material. In case where the number of the opening part is two or more, a width Wi of the opening part S1 is smaller than a width W2 between the opening part and the adjacent opening part. W1 is preferably 3 to 5 μm. The counter electrode 11 in FIG. 2A has three opening parts, wherein both sides 11b and 11c of the middle opening part and right side 11d of the right opening part and left side 11a of the left opening part constitute one counter electrode.

When voltage is applied to the LCD in FIG. 2B employing the counter electrode in FIG. 2A, the fringe field F1 is symmetrically formed centering around a center of the opening part S1 in an ellipse shape. That is, since the liquid crystal molecules are right-left symmetrically arranged, the right and left viewing angle of the LCD is improved. Here, the type of the liquid crystal used in the LCD is a type of preferably negative dielectric anisotropy.

In order to prevent light leakage at applying voltage to the LCD, between the non-opposite surface of the upper substrate 10 and the polarization layer 20a is provided the optical phase retardation compensation film 18. The optical phase retardation compensation film 18 consists of liquid crystals. If the liquid crystal inserted between the upper substrate and the lower substrate is rod type liquid crystal, the liquid crystal for the optical phase retardation compensation film 18 is disc type and vice versa.

Figure 3A:
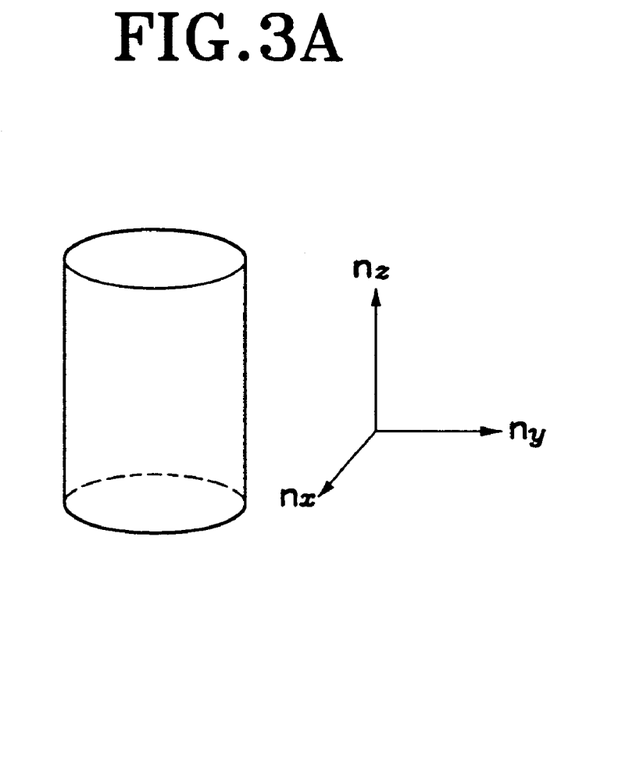
FIG. 3A shows a rod type liquid crystal.
Figure 3B:
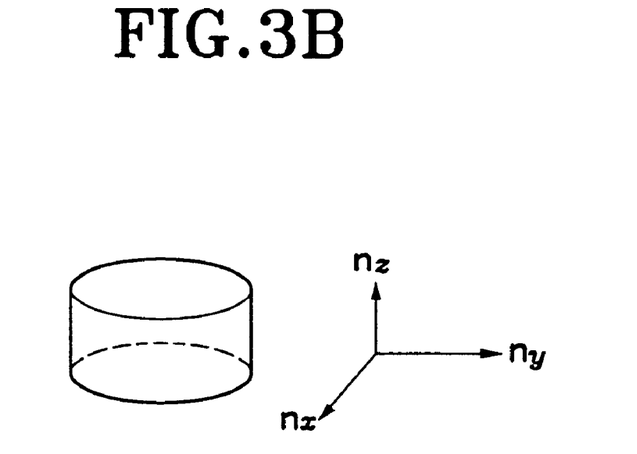
FIG. 3B shows a disc type liquid crystal.

FIG. 3A shows a rod type liquid crystal molecules. Since $n_x=n_y>n_z$, the LCD using the rod type liquid crystal shows a complete dark state in the front thereof. However, at side thereof, there is light leakage. Accordingly, by using the optical phase retardation compensating film consisting of disc type liquid crystal ($n_x=n_y<n_z$), is produced an effect that, before light reaches the polarization layer 20a, the light passes through an isotropical material having $n_x=n_y=n_z$. That is the phase retardation of the transmitted light is removed at sides of the LCD.

Second Embodiment

Figure 4A:
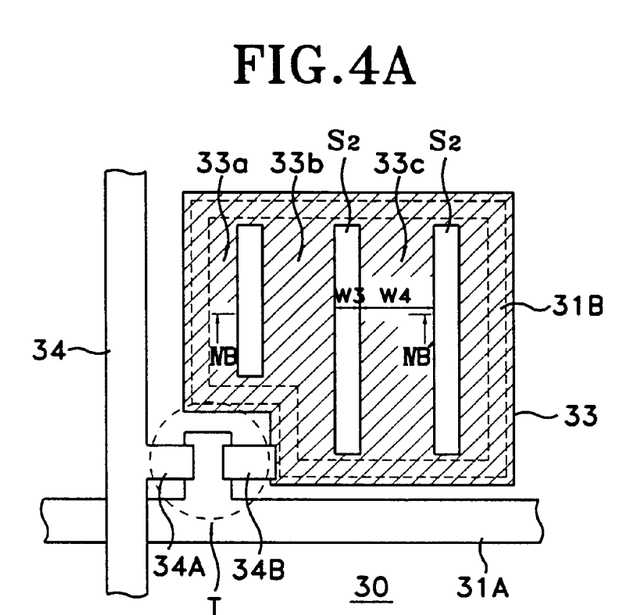
FIG. 4A shows a plane view of the LCD including a pixel electrode and FIG. 4A. 4B shows a cross-sectional view along IVB–IVB' in FIG. 4A.
Figure 4B:
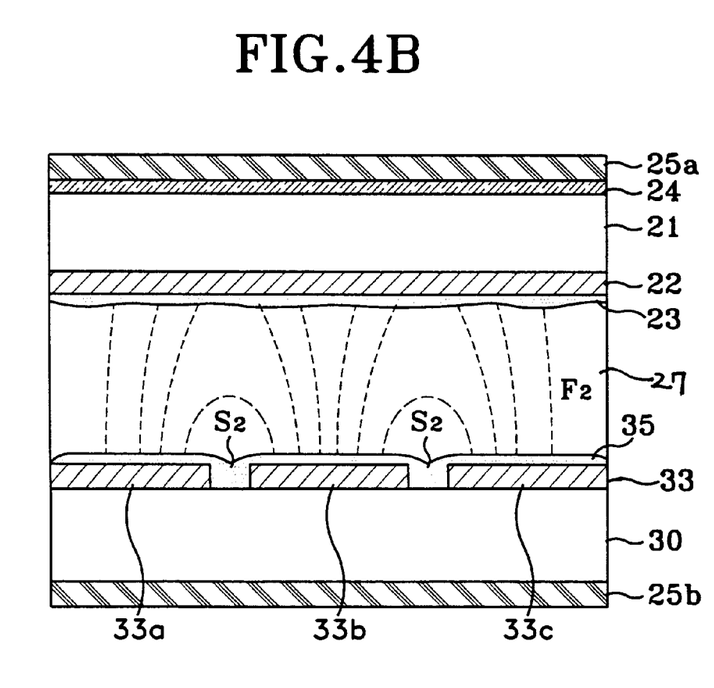

FIG. 4A is a plane view of the LCD containing a pixel electrode according to the second embodiment of the present invention and FIG. 4B is a cross-sectional view along IVB–IVB' in FIG. 4A. The LCD has a upper substrate 21, a lower substrate 30, a counter electrode 22 and a pixel electrode 33 formed respectively on the upper substrate 21 and the lower substrate 30, vertical alignment layers 23, 35 formed on the counter electrode 22 and the pixel electrode 33, polarization layers 23 and 35 formed respectively on the non-opposite surface of the upper substrate 21 and the nono-opposite opposite surface of the lower substrate 30 and an optical phase retardation compensation film 24 formed between the upper substrate 21 and the polarization layer 25a. On the other hand, the LCD has a data line 34 extending parallel to an opening part S2 of the pixel electrode and a gate line 31A vertically intersecting the data line 34. At the intersection of the gate line 31A and the data line 34, is disposed a thin film transistor(TFT) T. The TFT T has a gate electrode forming one body together with the gate line 31A, a source electrode forming one body with the data line and a drain electrode 34B overlapped with the gate electrode. The pixel electrode 33 is disposed at an area defined by the gate line 31A and the data line 34B and contacted with the drain electrode of the TFT. A storage electrode 31B for maintaining the addressing voltage for the liquid crystal for a time, is overlapped with the border of the pixel electrode 33. Here, the type of the liquid crystal used in the LCD is preferably negative dielectric anisotropy.

In detail, the counter electrode is made of transparent conductive material and the pixel electrode in FIG. 4A has similar shape to the counter electrode of FIG. 2A. The pixel electrode 33 has at least one opening part S2 and is made of transparent conductive material. When the number of the opening part of the pixel electrode is 2 or more, a width W3 of the opening part S2 is smaller than a width W4 between the opening part and the adjacent opening part. The width W3 is preferably 3 to 5 μm. The counter electrode in FIG. 4A has three opening parts, wherein both sides 33b and 33c of the middle opening part and right side 33d of the right opening part and left side 33a of the left opening part constitute one pixel electrode 33.

When voltage is applied to the LCD employing the pixel electrode of FIG. 4A, the fringe field F2 is symmetrically formed centering around a center of the opening part S2 in an ellipse shape, as shown in dotted line of FIG. 4B. That is, since the liquid crystal molecules are right-left symmetrically arranged, the right and left viewing angle of the LCD is improved.

The operation of the optical phase retardation compensation film 24, preventing the light leakage in no applied voltage, is the same as the optical phase retardation compensation film 18 of the first embodiment, whose description will be omitted herein.

Third Embodiment

Figure 5A:
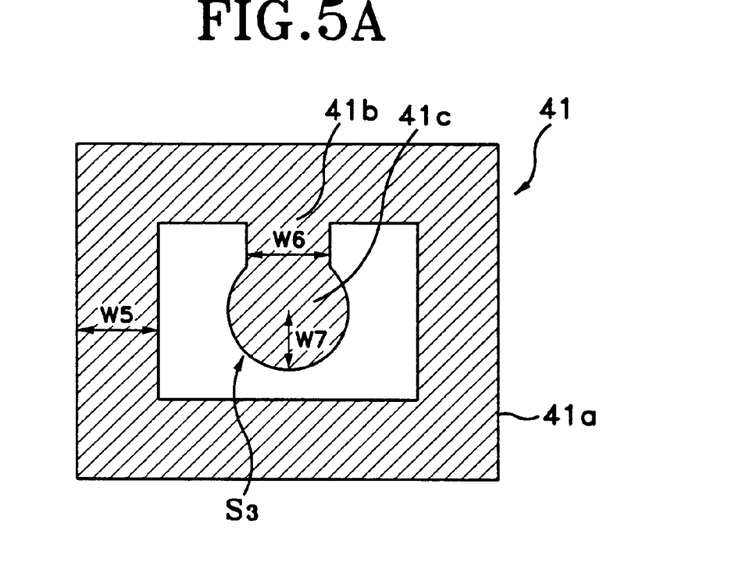
FIG. 5A shows a counter electrode and FIG. 5B shows a cross-sectional view of the LCD including the counter electrode in FIG. 5A.
Figure 5B:
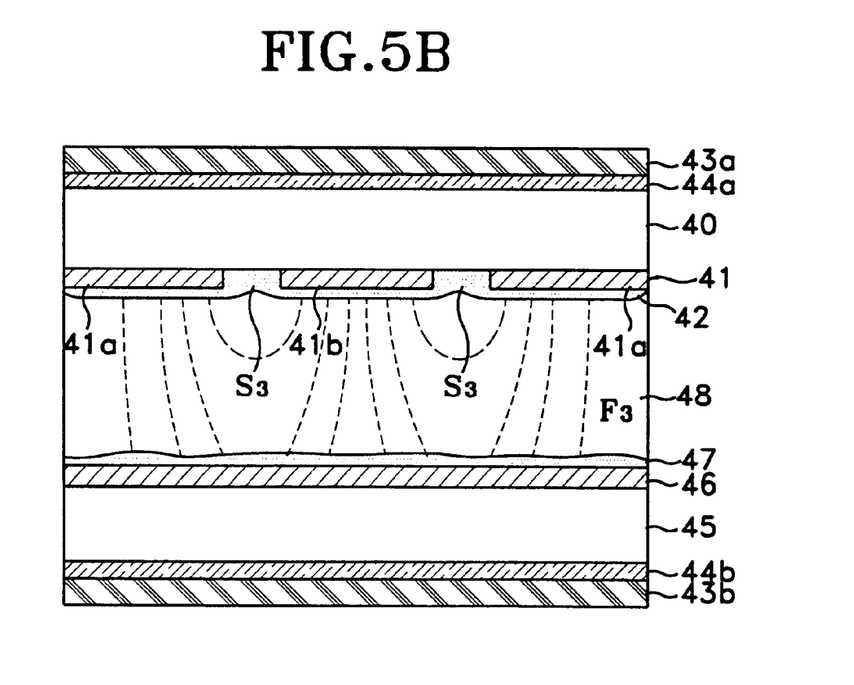

FIG. 5B is a cross-sectional view of the LCD according to the third embodiment. The LCD includes a upper substrate 40, a lower substrate 45, a counter electrode 41 and a pixel electrode 46 formed respectively on the upper substrate 40 and the lower substrate 46, vertical alignment layers 42, 47 formed on the counter electrode 41 and the pixel electrode 46, polarization layers 43a and 43b formed respectively on the non-opposite surface of the upper substrate 40 and the non-opposite surface of the lower substrate 45 and an optical phase retardation compensation film 44a formed between the upper substrate 40 and the polarization layer 43a and another optical phase retardation compensation film 44b formed between the lower substrate 45 and the polarization layer 43b. Here, the type of the liquid crystal used in the LCD is preferably negative dielectric anisotropy.

The pixel electrode 46 is made of transparent conductive material and the counter electrode 41, as shown in FIG. 5A, includes a rectangular frame 41a and a protrusion part 41b protruded toward a center of the rectangular frame 41a and a circle part 41c having a circle shape at end of the protrusion part 41b. An opening part S3 is defined by the rectangular frame 41a, the protrusion part 41b and the circle part 41c. A width W5 of the rectangular frame 41a, a width W6 of the protrusion part 41b and a radius W7 of the circle part 41c may be the same or different to each other. A distance between the circle part 41c and the rectangular frame 41a and a distance between the rectangular frame 41a and the protrusion part 41b are smaller than the widths W5, W6 and W7. Also, the counter electrode may have a plurality of protrusion parts and a plurality of circle parts each connected to each of the protrusion parts. Each protrusion part is separated from each other by a selected distance.

When voltage is applied to the LCD employing the counter electrode in FIG. 5A, the fringe field F3 is symmetrically formed in ellipse shape as shown in FIG. 5B. That is, since the liquid crystal molecules are symmetrically arranged, the viewing angle of the LCD is improved.

The operation of the optical phase retardation compensation films 44a and 44b, preventing the light leakage in no applied voltage, is the same as the optical phase retardation compensation film 18 of the first embodiment, whose description will be omitted herein.

Fourth Embodiment

Figure 6A:
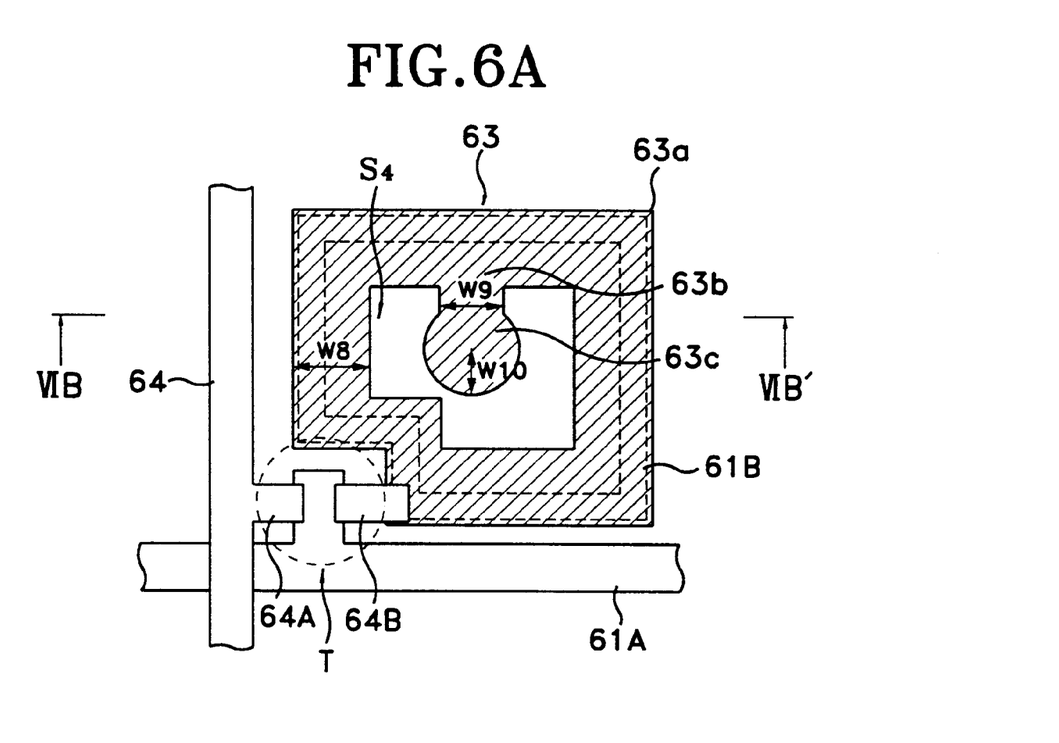
FIG. 6A shows a plane view of the LCD including a pixel electrode and FIG. 6B shows a cross-sectional view along VIB–VIB' in FIG. 4A.
Figure 6B:
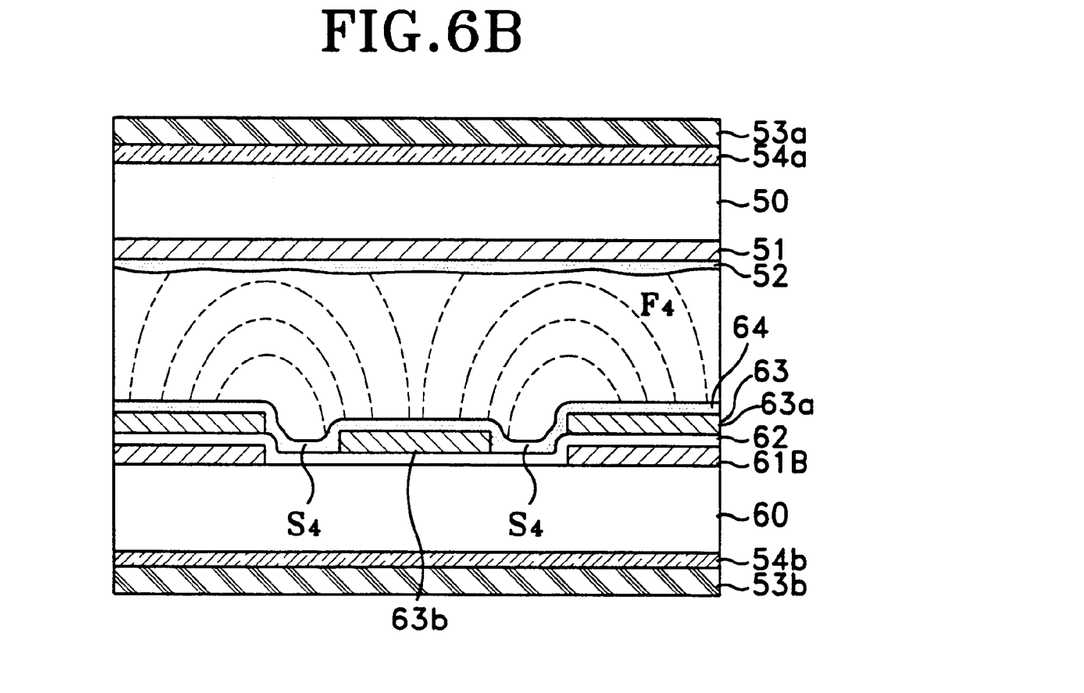

FIG. 6B is a cross-sectional view of the LCD according to the fourth embodiment of the present invention. The LCD has a upper substrate 50, a lower substrate 60, a storage electrode 61B formed on the lower substrate, a gate insulating layer 62 formed on the substrate with the storage electrode, a pixel electrode 63 formed on the gate insulating layer 63, a counter electrode 51 made of transparent conductive material and formed on an opposing surface of the upper substrate 50, vertical alignment layers 52, 64 formed on the counter electrode 51 and the pixel electrode 63, polarization layers 53a and 53b formed respectively on the non-opposite surface of the upper substrate 50 and the non-opposite surface of the lower substrate 60 and an optical phase retardation compensation film 54a formed between the upper substrate 50 and the polarization layer 53a and another optical phase retardation compensation film 54b formed between the lower substrate 55 and the polarization layer 53b.

Over the lower substrate 60, the gate line 61A vertically intersects the data line 64. At the intersection point of the gate line 61A and the data line 64, is disposed a thin film transistor(TFT) T. The TFT T has a gate electrode forming one body together with the gate line, a source electrode 64A forming one body with the data line and a drain electrode 64B overlapping the gate electrode. Also, a storage electrode 61B for maintaining the addressing voltage for the liquid crystal for a time, is overlapped with the border 63a of the pixel electrode 63. Here, the type of the liquid crystal used in the LCD is preferably negative dielectric anisotropy.

The pixel electrode is formed at an area defined by the gate line 61A and the data line 64A and connected to the drain electrode of the TFT. The pixel electrode 63, similarly to the counter electrode in FIG. 5A as shown in FIG. 6A, includes a rectangular frame 63a, a protrusion part 63b protruded toward a center of the rectangular frame 63a and a circle part 63c having a circle shape at end of the protrusion part 63b. An opening part S4 is defined by the rectangular frame 63a, the protrusion part 63b and the circle part 63c. A width W8 of the rectangular frame 63a, a width W9 of the protrusion part 63b and a radius W10 of the circle part 63c may be the same or different to each other. A distance between the circle part 63c and the rectangular frame 63a and a distance between the rectangular frame 63a and the protrusion part 63b are smaller than the widths W8, W9 and W10. Also, the pixel electrode may have a plurality of protrusion parts and a plurality of circle parts each connected to each of the protrusion parts. Each protrusion part is separated from each other by a selected distance.

When voltage is applied to the LCD employing the pixel electrode in FIG. 6A, the fringe field F4 is symmetrically formed in ellipse shape as shown in FIG. 6B. That is, since the liquid crystal molecules are symmetrically arranged, the viewing angle of the LCD is improved.

The operation of the optical phase retardation compensation films 54a and 54b, preventing the light leakage in no applied voltage, is the same as the optical phase retardation compensation film 18 of the first embodiment, whose description will be omitted herein.

On the other hand, the polarizing axis of the polarization layers at the upper substrate and the lower substrate in the first embodiment to the fourth embodiments are under vertical cross.

As described in the above, the pixel electrode or the counter electrode has an opening part so as to make the electric field symmetry between the pixel electrode and the counter electrode, so the viewing angle, when voltage is applied to the LCD, is increased. In addition, because the optical phase retardation compensation film is attached to the upper substrate and/or the lower substrate, the light leakage is prevented, in no applied voltage.

What is claimed is:

1. A liquid crystal display comprising:
   a first substrate;
   a first electrode formed on said first substrate and having a plate shape;
   a second substrate opposite said first substrate; and
   a second electrode formed on said second substrate opposite said first electrode and having a plate shape including an opening part, said second electrode including a rectangular frame, a first part, which projects inwardly from said rectangular frame, and a second part, which extends from an end of said first part and which has a circular shape, and said opening part being defined by said rectangular frame, said first part and said second part.

2. The liquid crystal display as claimed in claim 1, wherein one of said first electrode and said second electrode is a counter electrode and the other is a pixel electrode.

3. The liquid crystal display as claimed in claim 1, wherein said opening part is at least one in number.

4. The liquid crystal display as claimed in claim 3, wherein said opening part includes a plurality of openings, each of which has a width smaller than a distance between an adjacent pair of said openings.

5. The liquid crystal display as claimed in claim 4, wherein said width is about 3 to 5 μm.

6. The liquid crystal display as claimed in claim 1, wherein a liquid crystal between said first substrate and said second substrate is a type having a negative dielectric anisotropy.

7. The liquid crystal display as claimed in claim 1, wherein a width of said rectangular frame, a width of said first part and a radius of said second part are larger than a width of said opening part.

8. The liquid crystal display as claimed in claim 1, further comprising a first polarization layer formed on a non-opposite surface of said first substrate, a second polarization layer formed on a non-opposite surface of said second substrate, and an optical phase retardation compensation film formed between said first substrate and said first polarization layer.

9. The liquid crystal display as claimed in claim 1, further comprising a storage electrode, over said second substrate, overlapped with said second electrode at a selected portion.

10. The liquid crystal display as claimed in claim 9, wherein said selected portion is a border of said second electrode.

11. The liquid crystal display as claimed in claim 1, further comprising a first polarization layer formed on a non-opposite surface of said first substrate, a second polarization layer formed on a non-opposite surface of said second substrate, and an optical phase retardation compensation film formed between said second substrate and said second polarization layer.

12. A liquid crystal display comprising:

a first substrate;

a first electrode formed on said first substrate and having a plate shape;

a second substrate opposite said first substrate; and a second electrode formed on said second substrate opposite said first electrode and having a plate shape including an opening part, said opening part being at least one in number, said opening part having a plurality of openings, each of said openings having a width smaller than a distance between an adjacent pair of said openings, and said width ranging from about 3 $\mu$m to about 5 $\mu$m.

* * * * *